No. 644,094. Patented Feb. 27, 1900.
J. M. PRICE, Dec'd.
W. F. & W. L. PRICE, Executors.
ELECTRICAL BOND FOR RAILROAD RAILS.
(Application filed Apr. 23, 1894. Renewed Jan. 16, 1900.)

(No Model.)

Witnesses
Inventor
James M. Price
By John A. Wiedersheim
Attorney

UNITED STATES PATENT OFFICE.

JAMES M. PRICE, OF PHILADELPHIA, PENNSYLVANIA; WALTER F. PRICE AND WILLIAM L. PRICE EXECUTORS OF SAID JAMES M. PRICE, DECEASED.

ELECTRICAL BOND FOR RAILROAD-RAILS.

SPECIFICATION forming part of Letters Patent No. 644,094, dated February 27, 1900.

Application filed April 23, 1894. Renewed January 16, 1900. Serial No. 1,689. (No model.)

*To all whom it may concern:*

Be it known that I, JAMES M. PRICE, a citizen of the United States, residing in the city and county of Philadelphia, State of Pennsylvania, have invented a new and useful Electrical Bond and Conductor for Railroad-Rails, of which the following is a specification.

My invention consists of an improved construction of electrical bond and conductor for railroad T or girder rails, by which I connect electrically two meeting rails in such fashion as to pass from one to the other, the electrical current required in railway service the novel features of which will be hereinafter fully set forth, and particularly pointed out in the claims.

Figure 1:
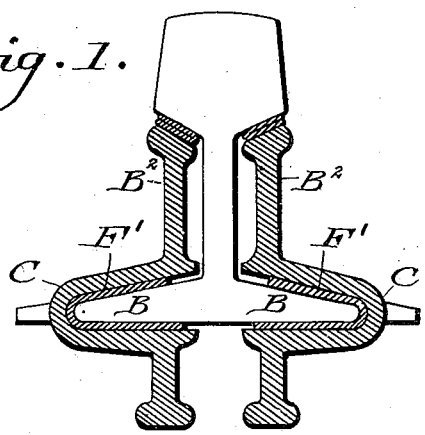
Figure 2:
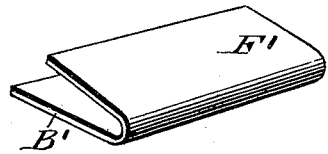
Figure 3:
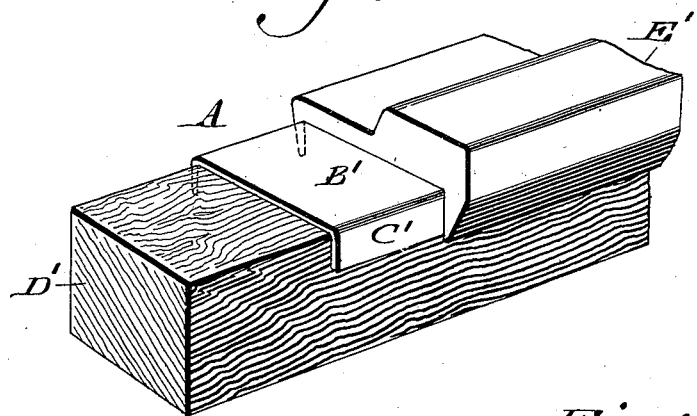
Figure 4:
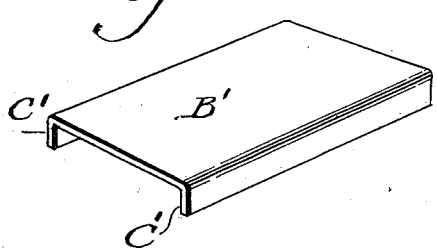
Figure 5:
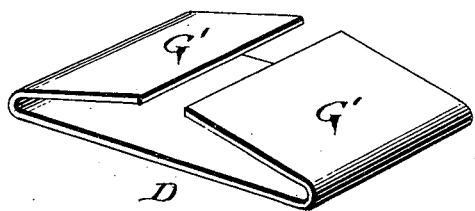

Figures 1 and 3 represent vertical sections of electrical bonds and conductors embodying my invention, the same being shown in position. Fig. 2 represents a perspective view of a member shown in Fig. 1. Fig. 4 represents a perspective view of a member shown in Fig. 3. Fig. 5 represents a perspective view of another form of my invention.

Similar letters of reference indicate corresponding parts in the figures.

A designates a bond consisting of the base or bed plate B' with depending flanges C' to embrace the sleeper D' and be embraced by flanges of the rail, such as E', said bond being constructed of a piece of sheet-copper or other electrically valuable conducting material for the transmission of an electrical current, or it may be bent in section approximately into the shape shown in Figs. 1 and 2, where the plate B' has a flange F' at top, forming, approximately, a V-shaped piece, one of such plates and flanges being placed on each side of the flanges B of two meeting T or girder rails B² in such manner and of such shape as accurately to fit the contour of the same when pressed up to the edges of these flanges where they come together for the purpose of forming part of a railway-joint. Outside of these two V-shaped pieces I place one of my rail-joint plates C on each side, inclosing the V-shaped piece within it, usually in a cavity therein made to receive the same and of a depth exactly matching the thickness of the V-shaped plate. The two joint-plates are driven to place by a severe blow or blows, making a forcible contact with the V-shaped bond on the outside, while its interior surface is also driven into forcible contact with and pressure upon the inclosed rail-flanges. It will be observed that I thus secure an exceedingly-large contact of surface with surface, the bond with the joint-plate and the bond with the rails greatly exceeding that of any other form of bond yet devised within my knowledge. Of course dirt and rust or other foreign substance should be first removed from the rail-surfaces and the joint-plate before applying this bond.

In Fig. 5 a continuous sheet D is employed in lieu of the two V-shaped pieces B' F', this sheet being provided with a flange G' at each side shaped so as to surround and fit accurately the two opposite rail-flanges on each side where they come together. The joint-plates being so made as to tend to adhere firmly to the rails inclosed under the pressure of the traffic over them, the original compression thus made upon the bonds inclosed between joint-plates and rails will be maintained.

It is believed that this invention will meet and overcome the universal difficulty of inadequate conductivity of the bonds as now laid generally, leading to disastrous damage to water and gas mains, &c., wherever laid, by their insufficiency to pass from rail to rail the electrical currents which the rails themselves could carry without appreciable loss to the earth.

It will be observed that my bonds are so placed as to exclude all contact with the earth, while I give the shortest conceivable distance for the bond alone to carry the electricity without help from the rails, being simply the gap between rail and rail instead of a gap measured by many inches from insertion of a copper wire at one end to the insertion of the other end, which in street practice involves the exposure and loss of current by contact of the wires with the earth and in railroads whose motive power is steam the annoyance and expense of wires exposed to continual breakage and liable to produce accident by their position and exposure.

Having thus described my invention, what

I claim as new, and desire to secure by Letters Patent, is—

1. The combination with the meeting ends of two rails having flanged bases, and a support for the joint thereof interfitting with said flanged bases, of a bond consisting of a flanged piece of an electric conducting material situated and fitting between the interfitting portions of the flanged bases of the rails and their support.

2. A sleeper, two rails having their adjacent ends supported thereon, and having depending flanges adapted to embrace the sides of the said sleeper, and the sheet of electric conducting material between the ends of said rail and said sleeper, said sheet having depending flanges between the flanges of the rails and the sleeper, said parts being combined substantially as described.

3. A copper, brass or other metallic sheet, laid in upon a sleeper used to carry railway-rails, where two rails come together, the edges of the sheet overhanging the sides of the sleeper, and the sheet underlying the rails themselves at their ends, as at once a protecting-roof to the sleeper at that point, and a sufficient electrical bond to carry the working electrical current from rail to rail, substantially as described.

JAMES M. PRICE.

Witnesses:
JOHN A. WIEDERSHEIM,
A. P. JENNINGS.